(12) United States Patent
Garotta et al.

(10) Patent No.: US 6,389,362 B1
(45) Date of Patent: May 14, 2002

(54) DEVICE FOR SEISMIC ACQUISITION

(75) Inventors: Robert Garotta, Gonfaron; Patrick Burger, Nantes, both of (FR)

(73) Assignee: Sercel (FR)

( * ) Notice: Subject to any disclaimer, the term of this patent is extended or adjusted under 35 U.S.C. 154(b) by 0 days.

(21) Appl. No.: 09/367,082

(22) PCT Filed: Feb. 6, 1998

(86) PCT No.: PCT/FR98/00223

§ 371 Date: Aug. 5, 1999

§ 102(e) Date: Aug. 5, 1999

(87) PCT Pub. No.: WO98/35244

PCT Pub. Date: Aug. 13, 1998

(30) Foreign Application Priority Data

Feb. 7, 1997 (FR) .............................................. 97 01427

(51) Int. Cl.$^7$ ................................................. G01V 1/28
(52) U.S. Cl. ......................................................... 702/17
(58) Field of Search ............................ 702/14, 16, 17, 702/18; 367/73, 40, 45, 48

(56) References Cited

U.S. PATENT DOCUMENTS

| | | |
|---|---|---|
| 3,881,166 A | 4/1975 | Fort et al. |
| 4,499,565 A | 2/1985 | Fix et al. |
| 5,189,644 A | 2/1993 | Wood |
| 5,392,213 A | 2/1995 | Houston et al. |
| 5,402,391 A | 3/1995 | Cordsen |
| 5,550,787 A | 8/1996 | Rialan |
| 5,555,218 A * | 9/1996 | Chambers et al. ............. 702/17 |
| 5,774,417 A * | 6/1998 | Corrigan et al. ............... 702/17 |

FOREIGN PATENT DOCUMENTS

| | | |
|---|---|---|
| FR | 1465789 | 12/1966 |
| GB | 1391829 | 4/1975 |
| GB | 2082771 | 3/1982 |

* cited by examiner

Primary Examiner—Donald E. McElheny, Jr.
(74) Attorney, Agent, or Firm—Blakely Sokoloff Taylor & Zafman

(57) ABSTRACT

Seismic acquisition apparatus comprising a plurality of detectors ($s_1$, $s_2$, etc.) each constituted by one or more seismic sensors, combiner means which generate at least one seismic trace corresponding to a group of detectors by combining the signals output thereby, and memory means for storing the seismic traces generated in this way, the apparatus being characterized in that it includes seismic preprocessor means ($\mu P_1$, $\mu P_2$, etc.) for re-phasing the signals output by the detectors prior to the signals being combined and/or prior to accidental noise on said signals being eliminated.

7 Claims, 5 Drawing Sheets

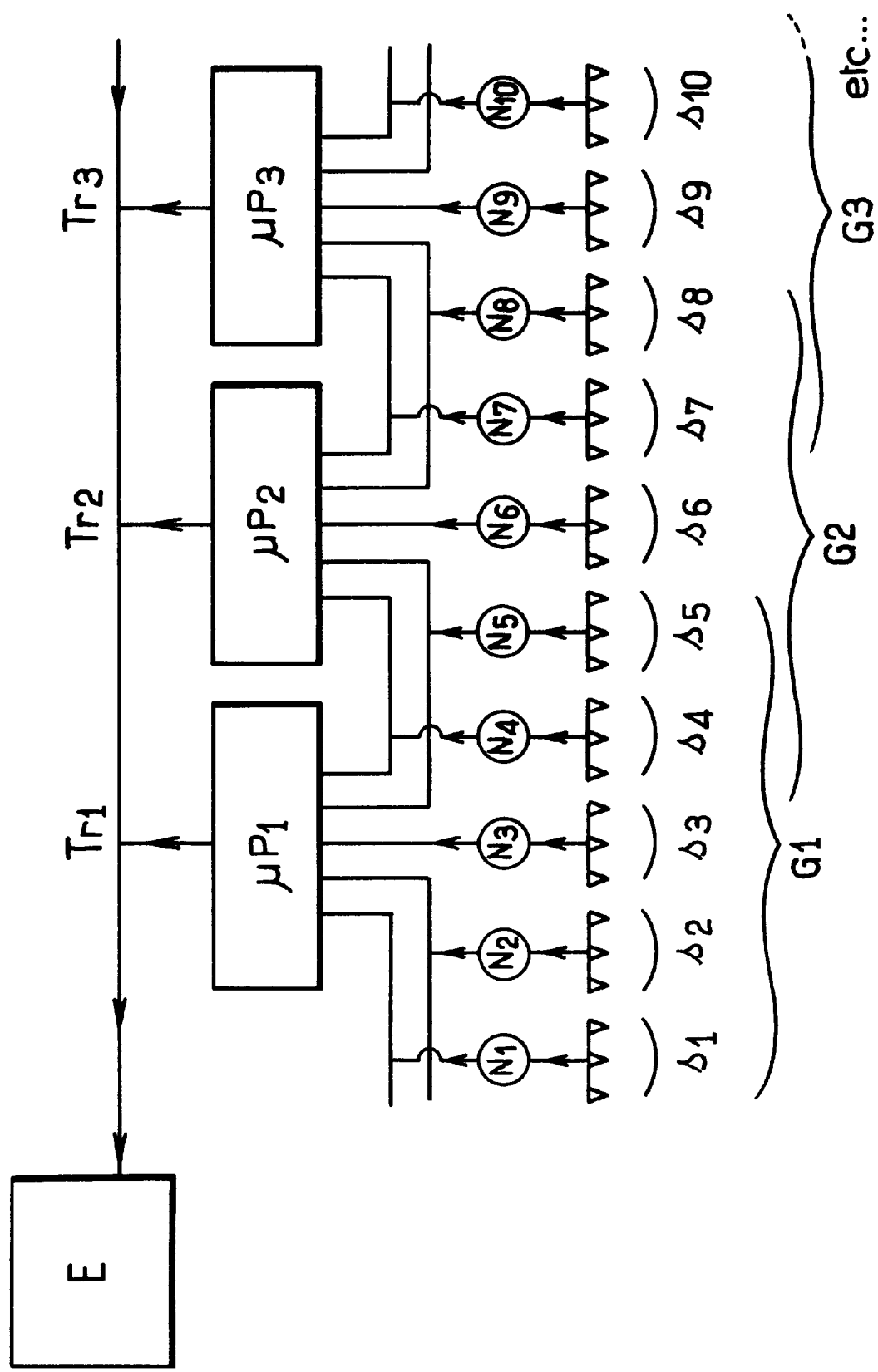
FIG_1

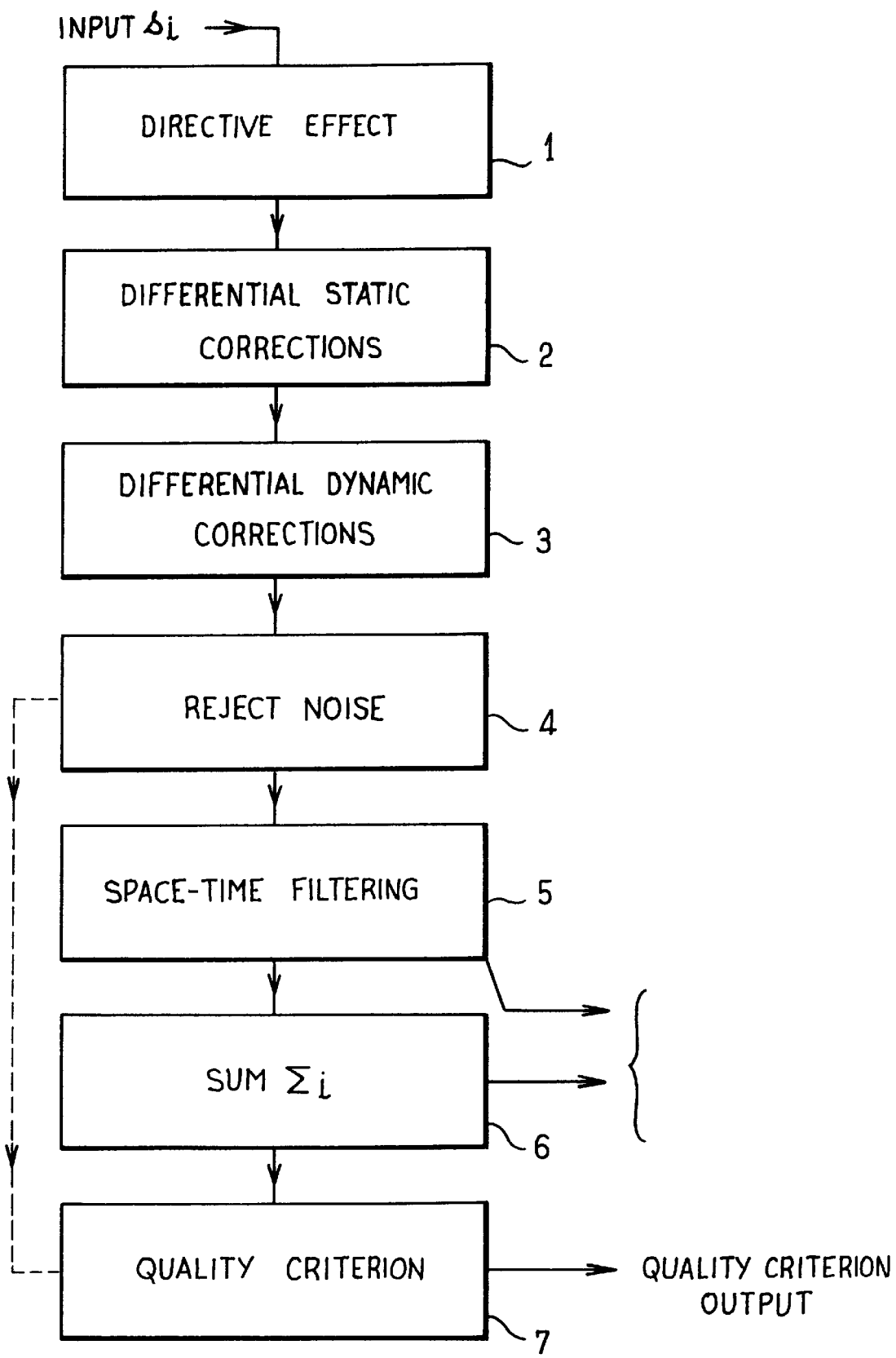
FIG_2

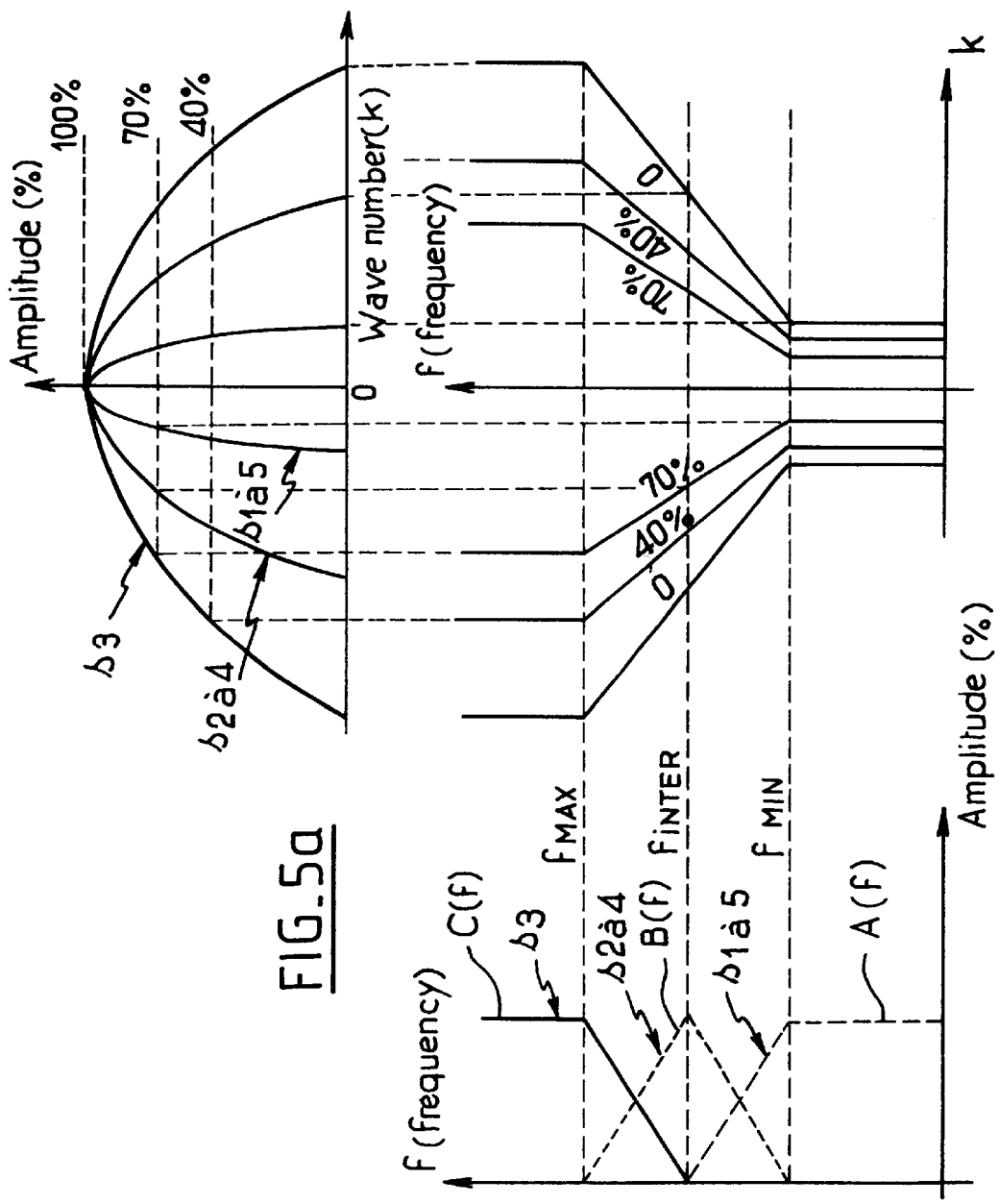

DEVICE FOR SEISMIC ACQUISITION

The present invention relates to seismic acquisition apparatuses.

In conventional practice, one or more detectors are used to perform seismic acquisition, each detector being constituted by a group of elementary sensors (geophones) distributed on the ground and interconnected so as to deliver the analog output of the detector to which they belong.

The analog signals output by the various detectors are seismic traces which are generally digitized prior to being recorded for subsequent processing.

Usually, the length of a detector is selected so as to achieve a compromise between eliminating seismic noise at long wavelengths and preserving high frequencies of the signal.

It is possible to eliminate surface noise by using groups of sensors of a length that is greater than the longest wavelength of the expected noise, but in so doing, the high frequencies of the reflected signal that are to be recorded are also attenuated.

To avoid such a compromise, proposals have been made in GB-1 391 829 for seismic acquisition apparatus in which the sensors within the same group are subdivided into a plurality of subgroups, each corresponding to a band of spatial frequencies, the analog signals output from the various subgroups being time-filtered, and then recombined to deliver the seismic trace corresponding to the group of sensors.

Thus, upstream from the recording, a fan of space-time filtering is performed enabling seismic traces to be acquired that are cleared of the long wavelengths of seismic noise but that maintain the high spatial frequencies of the signal as received at the elementary sensors.

In a more recent variant of that technique, as described in U.S. Pat. No. 4,499,565, it is proposed to use sensors having different natural frequencies for the various subgroups, such that the effect of combining the sensors is to perform both space filtering and frequency filtering directly.

Nevertheless, even with such prior space-time filtering, the seismic traces recorded at the outlet from such apparatuses are not of satisfactory quality.

The main object of the invention is to improve the quality of the seismic traces that are recorded.

Already disclosed in U.S. Pat. No. 5,550,787 is seismic acquisition apparatus in which the signals output by the detectors are acquired by means of an acquisition system including, in particular, a lowpass filter, a preamplifier, and a highpass filter, after which the signals are processed for storage purposes.

The invention provides a seismic acquisition apparatus comprising a plurality of detectors constituted by one or more seismic sensors, space-time filtering means which generate at least one seismic trace corresponding to a group of detectors by combining signals output therefrom, and storage means for storing the seismic traces generated in this way, the apparatus being characterized in that it comprises seismic preprocessor means for re-phasing the signals output by the detectors and/or for space-time filtering said signals prior to the signals being summed.

Advantageously, the preprocessor means also comprise means for determining at least one parameter representative of the quality of the signals picked up by the detectors.

Preferably, the preprocessor means are of the digital type.

Also, at least one detector belongs to two different groups, the preprocessor means using the signal output by said detector to generate seismic traces corresponding to both of said groups.

It will be observed that the connections used in the acquisition apparatuses described both in GB 1 391 829 and U.S. Pat. No. 4,499,565 are complicated and expensive, requiring a large number of elementary sensors. Consequently, they are difficult to implement.

Digital type preprocessor means make implementation very simple. They also make it possible to use a single detector in a plurality of groups, and consequently to reduce significantly the number of detectors and thus the cost of the acquisition apparatus.

Furthermore, in the techniques proposed in GB 1 391 829 and U.S. Pat. No. 4,499,565, the filtering performed remains imprecise and is no more than a mere staircase approximation to ideal filtering corresponding to a constant apparent speed. In addition, those filters suffer from the drawback of being "frozen" by construction and of being difficult to modify during acquisition.

Another object of the invention is thus to propose acquisition apparatus that makes it possible to perform space-time filtering of better quality than that made possible by the apparatuses described in GB 1 391 829 and U.S. Pat. No. 4,499,565, and also to provide greater flexibility in processing.

To this end, the preprocessor means perform space-time filtering of the progressive fan type on the output signals from the detectors.

Filtering is said to be "progressive" when it corresponds, in a representation in the space-frequency domain, to attenuation level curves that are continuous.

It will be observed that the use of digital preprocessor means for combining the signals output from the detectors and for forming the seismic traces makes it possible to perform such progressive filtering, and thus to perform filtering that coincides with the desired ideal filtering.

Other characteristics and advantages of the invention appear further from the following description. This description is purely illustrative and non-limiting. It should be read with reference to the accompanying drawings, in which:

FIG. 1 is a diagram of seismic acquisition apparatus constituting one possible embodiment of the invention;

FIG. 2 is a flow chart showing the various possible preprocessing steps for the apparatus of FIG. 1;

FIG. 5a is a graph on which the amplitude response of the various combinations of detector subgroups implemented by the preprocessor means of the apparatus of FIG. 1 are plotted as a function of wave number;

FIG. 5b is a graph in which there are plotted the various frequency filters that are applied to the combinations corresponding to the responses of FIG. 5a;

FIG. 5c is a graph in which various curves for attenuation level of the space-time filtering obtained by combining the responses of FIGS. 5a and 5b are plotted in the spectrum domain.

Figure 3A:
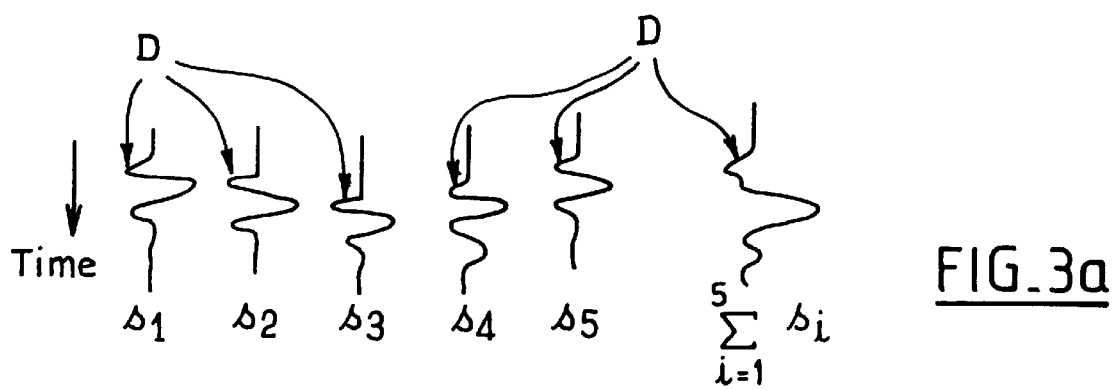
FIG. 3a shows the appearance of a combination of seismic signals that have not been re-phased.

The acquisition apparatus which is shown in FIG. 1 comprises a plurality of detectors $s_1, s_2, \ldots s_n$, each constituted by one or more elementary seismic sensors (single component geophones, or indeed triphones).

These various elementary sensors are distributed, for example, linearly on the ground, with the distance between two successive sensors being constant over the entire length along which they are distributed.

The analog signal output by each detector $s_1, s_2, \ldots, s_n$ is applied to a digitizer $N_1, N_2, \ldots, N_n$, and then after digitizing to a plurality of processor units $\mu P_1, \mu P_2, \ldots$.

More particularly, each processor unit receives the digitized signals coming from a group of detectors. It processes these various signals so as to generate a seismic trace which corresponds to said group of detectors by combining the signals.

In FIG. 1, the seismic traces output by the microprocessors $\mu P_1, \mu P_2, \ldots$, etc. are referenced $Tr_1, Tr_2, \ldots$, etc., and the corresponding groups of detectors are referenced $G_1, G_2, \ldots$, etc. The seismic traces $Tr_1, Tr_2, \ldots$, etc., are sent, e.g. over a wire link or by radiotelemetry, to a recording unit E in which they are stored.

Some detectors form parts of a plurality of groups simultaneously: in the example of FIG. 1, detectors $S_4$ and $s_5$ belong both to group $G_1$ and to group $G_2$; detectors $s_7$ and $s_8$ belong both to group $G_2$ and to group $G_3$.

This makes it possible to reduce considerably the number of elementary sensors used in the apparatus, e.g. by halving it in the event of 2D acquisition with an inter-group distance of 25 meters (m), a group diameter of 50 m, and an inter-sensor spacing of about 3 m.

As will have been understood, the architecture described above is very flexible, since it is possible at all times to reprogram the microprocessor(s) $\mu P_1, \mu P_2$, etc. so as to modify the groups $G_1, G_2$, etc., or indeed the processing applied to the outputs from the detectors.

The processing implemented by the microprocessors $\mu P_1, \mu P_2, \ldots$, etc., on the digital signals they receive from the detectors are described below with reference to FIG. 2.

In the example which corresponds to the flow chart of FIG. 2, the signals are subjected to seven processes.

Three of these processes (those of steps 1 to 3) corresponds to re-phasing processes.

More particularly, in step 1, processing is performed to correct the delay that the various signals picked up by the detectors $s_i$ can have relative to one another because of geological dip.

In step 2, the phase offsets that the signals picked up by the various sensors $s_i$ can have relative to one another because of altitude are corrected.

In step 3, the phase offsets that the signals picked up by the various detectors $s_1$ can have relative to one another because of changes of migration are corrected.

The microprocessors $\mu P_1, \mu P_2$, etc., also implement rejection processing (step 4) and combination processing (space-time filtering in step 5, or summing in step 6).

A final process (step 7) serves to determine one or more parameters that are representative of the quality of the seismic traces as stored.

As will have been understood, depending on the particular configuration that is present, it can be preferable to implement some only of the steps shown by the flow chart of FIG. 2.

It will also be observed that the outlet from step 6, if activated on its own, corresponds to the conventional sum of the signals output by the detectors. It can be activated independently of step 5 or together therewith, in which case it is possible to have two different traces output from the processing.

The various steps are described in greater detail below.

Figure 3B:
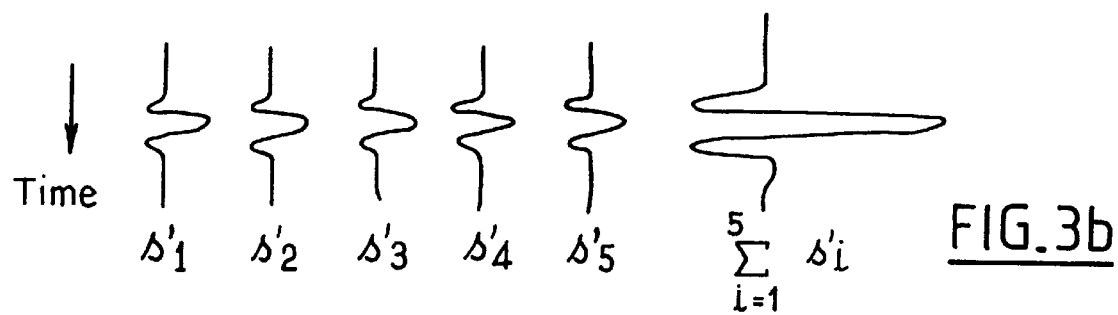
FIG. 3b shows the appearance of a combination of seismic signal that have been re-phased.

The effect of the re-phasing processing of steps 1 to 3 is shown in FIGS. 3a and 3b which show respectively the signals at output by the detectors before and after re-phasing, and also the sum thereof.

The correction for phase offset due to dip (directional effect—step 1) is performed by applying a time offset to the signal taken by each detector $s_i$ that is given as follows:

$$\tau_i = i_i \times g$$

where g is the time gradient and where $p_i$ is the distance between the center of gravity of the detector $s_i$ and the trace on the horizontal plane of the dip plane passing through the center of gravity of the set of detectors belonging to a given group.

As will have been understood, this processing assumes that prior knowledge is available concerning the azimuth of the dip, the value of the dip (which defines the time gradient in the relationship $\sin \alpha = Vg$, where V is the velocity of the medium and $\alpha$ is the dip angle relative to the horizontal), and the geometrical configuration of the sensors constituting the detectors.

The static phase offset corrections due to height (step 2) can be determined in various ways. When the differential heights of the various detectors are known, then time offsets are applied to the various detectors that are proportional to said differences in height.

In a variant, it is also possible to re-phase the signals by determining the starting instants thereof (D in FIG. 3a) and by resetting the starting instants as a function of the distances $X_i$ between the various detectors $s_i$ and the seismic source.

Differential dynamic correction step 3 makes it possible to correct for phase offsets due to the slopes of the soundwave paths, with said correction increasing with increasing distance of the detectors from the source, $X_m$ being the average distance to the source. The signal from detector $s_i$ situated at the distance $X_i$ from the source is subjected to a positive time offset (if $X_i < X_m$) or to a negative time offset (if $X_i < X_m$) which is a function of $X_m$, of $(X_m - X_i)$, of the time required for recording, and of the recovery speed.

The formula giving the offset to be applied relative to the recording time (also known as the reflection time) T is written as follows:

$$\partial(\Delta T)_i = \frac{(X_i - X_m)}{X_m V^2 \sqrt{T^2 + X_m^2/V^2}}$$

Naturally, steps 1 to 3 can be implemented in an order other than that shown in FIG. 2.

Noise rejection step 4 serves to eliminate accidental noise from the received signals.

Figure 4A:
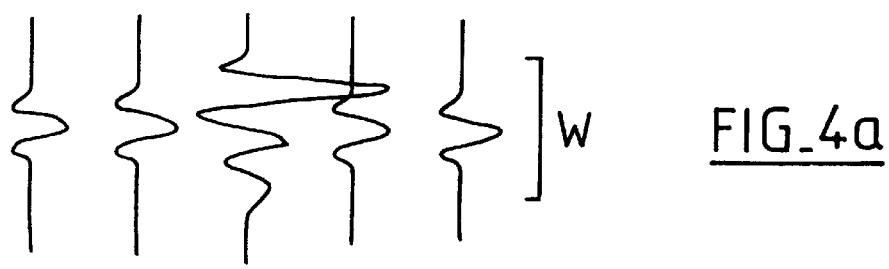
FIGS. 4a and 4b show the processing for eliminating accidental noise as implemented by the invention.
Figure 4B:
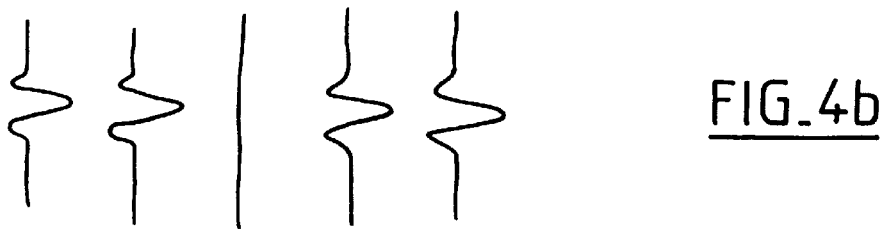

FIG. 4a shows the appearance of the signals output from five successive detectors, with the middle detector being subject to accidental noise.

To detect such noise, the amplitude or the energy of the signal is evaluated for each received signal within a given time window.

For example, the sum $\Sigma_L |a_i|$ or $\Sigma_L a_i^2$ is determined over a signal output by a detector where $a_i$ corresponds to the sampled values of the signal and L is the length of the time interval in which the signal is analyzed.

By way of example, the sampling interval is L/2 (the received signal is evaluated over three values).

It is also possible, when the distances between the source and the detectors are known, to apply correction terms to said values (e.g. $1/X_i$ or $1/X_i^2$ for the detector situated at a distance $X_i$ from the source) to take account of amplitude or energy dispersion.

When a value as obtained in this way exceeds a given threshold, e.g. a function of the middle value of the values obtained for the group, the output signal from the detector for which accidental noise has been detected in this way is caused to be zero. To reestablish the amplitude that results from the level of the sum, the signals output by the other detectors are increased by a ratio p/(p−q) where p is the number of detectors within a group and where q is the number of detectors exceeding the threshold.

The space-time filtering of step 5 is described below in greater detail with reference to FIGS. 5a to 5c.

FIGS. 5a to 5c relate to the group $G_1$ as defined by detectors $s_1$ to $s_5$, and they show an example of the processing that is possible to obtain the seismic trace corresponding to said group.

After digitization, three combinations are performed on the outputs from the detectors $s_1$ to $s_5$, one combination comprises summing the outputs from the detectors $s_1$ to $s_5$, another constitutes summing the outputs from the detectors $s_2$ to $s_4$, and the third corresponds to the output from detector $s_3$ on its own.

Thus, on a noisy signal as received from the detectors, corresponding space filtering is performed as a function of wave number (referenced k in the text below) on the responses a(k), b(k), and c(k) as shown in FIG. 5a.

The function a(k) (which corresponds to the sum of all of the outputs from the detectors of group $G_1$) attenuates long wavelengths; the function b(k) (the sum of the outputs from the middle detectors $s_2$, $s_3$, and $s_4$) correspond to intermediate filtering; and the function c(k) ($s_3$ on its own) corresponds to minimum space filtering which does not degrade the special high frequencies (wave numbers) of the expected signal.

Frequency filtering is also applied to each combination of outputs from the detectors $s_1$ to $s_5$, with this filtering being applied before or after summing of the outputs from the detectors, the frequency filtering corresponding, for example, to three functions A(f), B(f), and C(f), as shown in FIG. 5b.

In the example shown in said FIG. 5b:
- the frequency filtering A(f) which is applied to the first combination is such that A(f) is zero for f greater than a given value $f_{inter}$, decreases linearly from 1 to 0 for values of f lying in the range $f_{min}$ less than $f_{inter}$, and equal to 1 in the range 0 to $f_{min}$;
- the frequency filtering B(f) which is applied to the second combination is such that B(f) is zero for f greater than a given value $f_{max}$ greater than $f_{inter}$ and for f less than the value $f_{min}$, increasing linearly from 0 to 1 for values of f lying in the range $f_{min}$ to $f_{inter}$, and decreasing linearly from 1 to 0 for values of f lying in the range $f_{inter}$ to $f_{max}$; and
- the frequency filtering C(f) which is applied to the third combination is such that C(f) is zero for values of f lying in the range 0 to $f_{inter}$, increases linearly from 0 to 1 for values of f lying in the range $f_{inter}$ to $f_{max}$, and is equal to 1 for values of f greater than $f_{max}$.

The values $f_{min}$ and $f_{max}$ corresponds respectively to a typical noise frequency and a frequency greater than noise frequency. The value $f_{inter}$ is selected as being the middle value between $f_{min}$ and $f_{max}$.

The resulting seismic trace is the sum of the combinations as filtered in space and in frequency as described above. In the f/k plane, the resulting space-time filtering which corresponds to:

$$A(f)a(k)+B(f)b(k)+C(f)c(k)$$

is fan filtering of the type shown in FIG. 5c, where curves are plotted for attenuation of −3 dB and of −6 dB, together with the curve below which the resulting response goes through zero and remains small, the response having absolutely no attenuation on the straight line k=0.

As can be seen from FIG. 5c, the space-time filtering performed in this way is progressive over the range $f_{min}$ to $f_{max}$ and consequently provides greater accuracy than staircase filtering of the kind that can be obtained using the apparatuses described in GB 1 391 829 and U.S. Pat. No. 4,499,565.

In the particular example shown with reference to FIGS. 5a to 5c, the filtering performed coincides with filtering that corresponds to constant apparent speed in the range $f_{min}$ to $f_{max}$, which filtering is generally considered as being optimal.

The microprocessor(s) $\mu P_1$, $\mu P_2$, etc., is/are preferably programmed in such a manner that the groups of detectors $G_1$, $G_2$, etc., all have a sufficient number of elementary sensors to eliminate seismic noise of long wavelengths, while the detectors $sg_1$, $sg_2$, ..., $sg_n$ have a number of elementary sensors that is sufficiently small to comply with the high frequencies of the signal.

In step 7, a parameter is determined that is representative of the quality of the signals received from the outputs of the detectors $s_i$, prior to the combinations being performed on said signals.

The quality criteria can be determined from the quantities calculated in step 4. By way of example, they correspond to the following parameters:

$$C_1 = \frac{\sum_0^p |\Sigma_L a_i|}{p \sum_0^p \Sigma_L |a_i|}$$

$$C_2 = \frac{\sum_0^p |\Sigma_L a_i|^2}{p \sum_0^p \Sigma_L a_i^2}$$

$$C_3 = \frac{\sum_0^p |\Sigma_L a_i|}{\sum_0^p \Sigma_L |a_i - a_{i+1}|}$$

which can be determined from the quantities calculated in step 4.

The parameters $C_1$ to $C_3$ increase with increasing resemblance between the signals output by the detectors within a given group.

Nevertheless, the criteria $C_1$ and $C_2$ are limited to 1 (value corresponding to perfect similarity), while the criterion $C_3$ is more sensitive and can, in theory, tend to infinity.

The selection of one or another of these criteria depends on the looked-for sensitivity.

It will be observed that the fact of having criteria that relates to the quality of the signals output by the detectors constitutes a significant contribution since the quality of a seismic recording is generally assessed empirically by operators, merely by visually inspecting a printout of the recording.

Other quality parameters can naturally be considered, for example, values of ratios between the sum of crosscorrelation peaks and the sums of self-correlation peaks, or indeed the ratio between the time zero sample of the signal and the maximum sample at a non-zero time (noise).

Figure 6A:
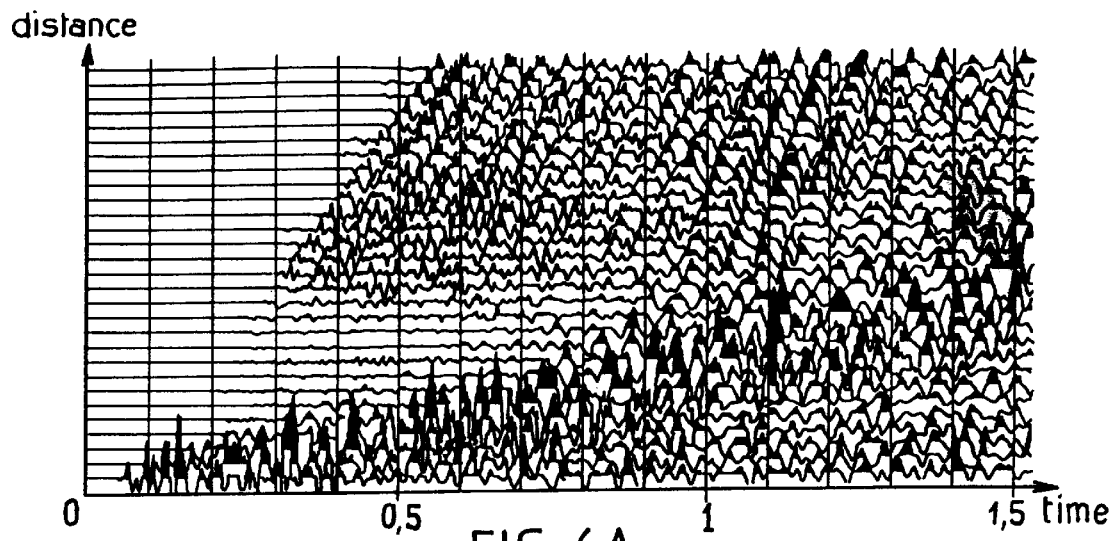
FIGS. 6a to 6c are seismic measurements showing the implementation of space-time filtering processing of the type shown in FIGS. 5a to 5c.
Figure 6B:
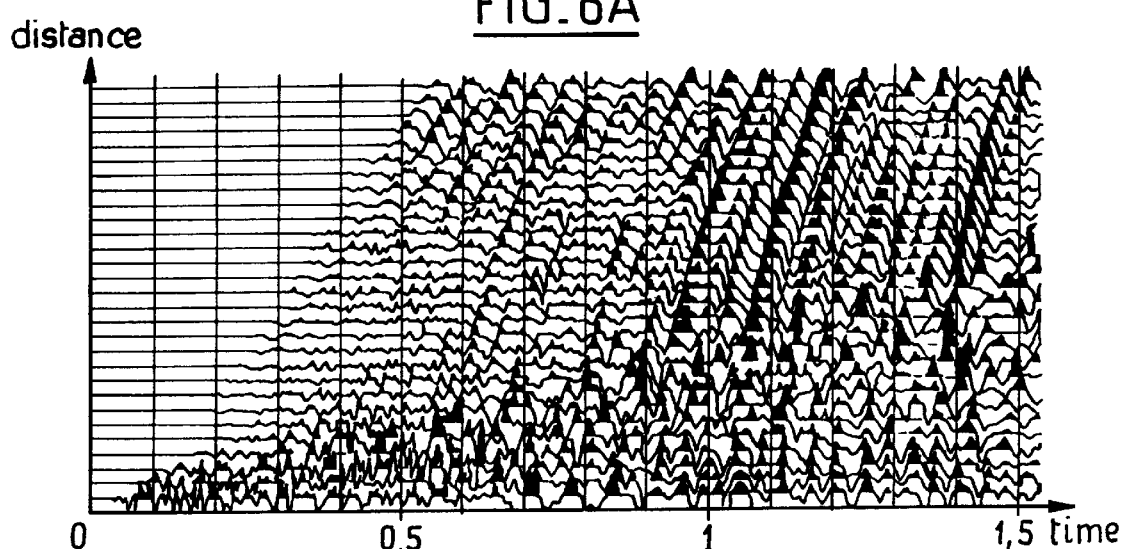
Figure 6C:
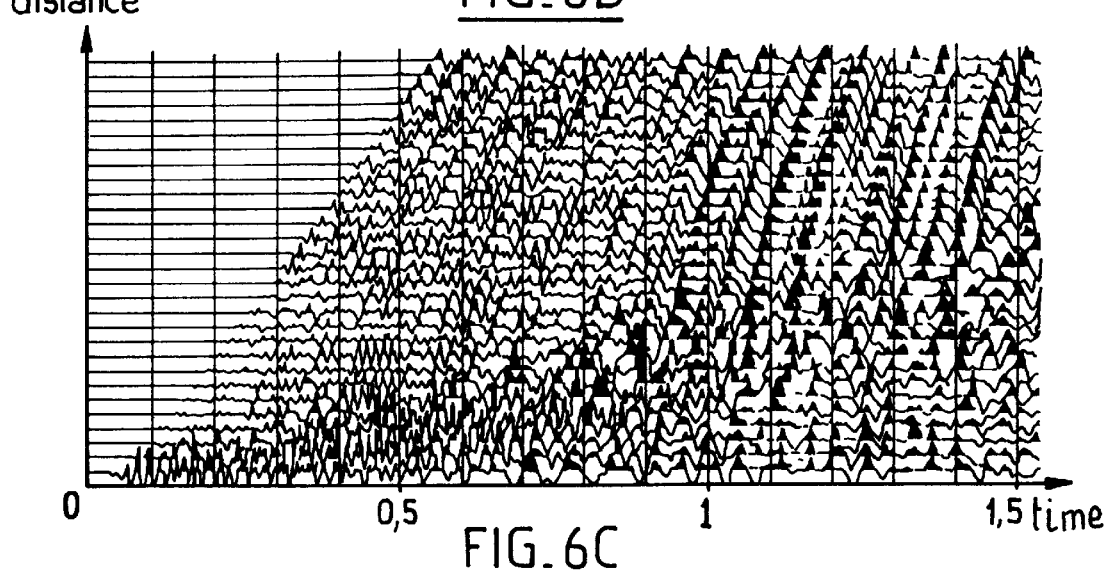

An example of the results of the preprocessing is shown in FIGS. 6A to 6C.

FIG. 6A shows measurements obtained at the output from a detector, the measurements having no space filtering.

FIG. 6B shows measurements obtained by conventionally summing the outputs of 15 detectors within a group of length 30 m.

FIG. 6C shows the measurements obtained under the same conditions while implementing the space-time filtering as described above with reference to FIGS. 5a to 5c. It can be seen that compared with the measurement shown in FIGS. 6A and 6B, the measurements of FIG. 6C are subject to less noise and carry a great deal more information.

Variant embodiments other than those described above can naturally be envisaged.

In particular, the invention is described mainly in the context of 2D acquisition, but it can also be applied to 3D acquisition.

Also, additional preprocessing operations other than those described above can be envisaged, e.g. filter processing based on polarization.

It is also possible for all of the preprocessing to be centralized for various groups of detectors in a single microprocessor; instead of having one analog-to-digital converter per detector, it is possible to provide converters having a plurality of inputs that are distributed along the entire length of an acquisition line.

What is claimed is:

1. Seismic acquisition apparatus comprising a plurality of detectors ($s_1, s_2, \ldots s_n$ where n is a finite number) including at least one seismic sensor, and storage means for storing seismic traces, said apparatus further including preprocessor means which receive the signals output from the detectors and combine them to generate said seismic traces which are sent to the storage means, said preprocessor means performing at least one of a re-phasing of the signals output by the detectors and a space-time filtering of said signals.

2. Apparatus according to claim 1, characterized in that the preprocessor means ($\mu P_1, \mu P_2$, etc.) also comprise means for determining at least one parameter representative of the quality of the signals picked up by the detectors.

3. Apparatus according to claim 1, characterized in that the preprocessor means are of the digital type.

4. Apparatus according to claim 1, characterized in that at least one detector ($s_1, s_2$, etc.) belongs to two different groups ($G_1, G_2$, etc.), the preprocessor means ($\mu P_1, \mu P_2$, etc.) using the signal output by said detector to generate seismic traces corresponding to both of said groups.

5. Seismic acquisition apparatus according to claim 1, characterized in that the preprocessor means perform space-time filtering corresponding to a filter function of the A(f)a(k)+B(f)b(k)+C(f)c(k) type, in which f and k are frequency and wave number variables, and in which a(k), b(k), and c(k) are space filtering functions, a(k) corresponding to filtering the long wavelengths of the expected seismic noise, b(k) corresponding to filtering intermediate wavelengths, and c(k) performing filtering that passes the signal above a given wave number;

A(f), B(f), and C(f) being frequency filter functions corresponding to filtering which is associated with the combinations that correspond to the functions a(k), b(k), and c(k).

6. Seismic acquisition apparatus according to according to claim 5, characterized, in that the frequency filtering function A(f) which is applied to the first combination is such that A(f) is zero for f greater than a given value $f_{inter}$, decreases linearly from 1 to 0 for values of f lying in the range $f_{min}$ less than $f_{inter}$, and is equal to 1 in the range 0 to $f_{min}$;

in that the frequency filter function B(f) which is applied to the second combination is such that B(f) is zero for f greater than a given value $f_{max}$ greater than $f_{inter}$ and for f less than the value $f_{min}$, increasing linearly from 0 to 1 for values of f lying in the range $f_{min}$ to $f_{inter}$, and decreases linearly from 1 to 0 for values of f lying in the range $f_{inter}$, to $f_{max}$; and in that the frequency filter function C(f) which is applied to the third combination is such that C(f) is zero for values of f lying between 0 and $f_{inter}$, increases linearly from 0 to 1 for values of f lying between $f_{inter}$ and $f_{max}$, and is equal to 1 for values of f greater than $f_{max}$.

7. Seismic acquisition apparatus according to claim 6, characterized, in that the value $f_{min}$ corresponds to a typical frequency for seismic noise, the value of $f_{max}$ corresponding to a frequency greater than that of a seismic noise.

* * * * *